United States Patent [19]

Nagaishi

[11] 4,377,145

[45] Mar. 22, 1983

[54] INTAKE VACUUM SENSING SYSTEM WITH CORRECTION DEVICE FOR AN INTERNAL COMBUSTION ENGINE

[75] Inventor: Hatsuo Nagaishi, Yokosuka, Japan

[73] Assignee: Nissan Motor Co., Ltd., Yokohama, Japan

[21] Appl. No.: 190,294

[22] Filed: Sep. 24, 1980

[30] Foreign Application Priority Data

Sep. 27, 1979 [JP] Japan .................. 54-133584[U]

[51] Int. Cl.³ .................................... F02M 51/00
[52] U.S. Cl. .................................. 123/494; 123/463; 123/478; 73/115; 73/116
[58] Field of Search ............... 123/494, 478, 463; 73/115, 116

[56] References Cited

U.S. PATENT DOCUMENTS

| | | | |
|---|---|---|---|
| 3,460,520 | 8/1969 | Huber | 123/478 |
| 3,712,275 | 1/1973 | Jackson | 123/494 |
| 3,908,614 | 9/1975 | Ironside et al. | 123/494 |
| 4,111,041 | 9/1978 | Rice | 73/115 |
| 4,165,650 | 8/1979 | Weissler | 73/115 |
| 4,195,531 | 4/1980 | Okamura | 73/115 |

*Primary Examiner*—P. S. Lall
*Attorney, Agent, or Firm*—Thompson, Birch, Gauthier & Samuels

[57] ABSTRACT

An intake vacuum sensor with a correction device for determining intake vacuum in an engine intake manifold can correct the sensor output when intake vacuum temperature introduced into the sensor is relatively high or the engine is driven for a relatively long period. The correction device comprises a memory unit for storing a correction coefficient, a correction circuit for correcting the sensor output based on the correction coefficient and a valve means for selectively introducing the intake vacuum and atmospheric air to the vacuum sensor. The memory unit, correction circuit and valve means are operatively responsive to the correction command from an engine control means.

8 Claims, 3 Drawing Figures

INTAKE VACUUM SENSING SYSTEM WITH CORRECTION DEVICE FOR AN INTERNAL COMBUSTION ENGINE

BACKGROUND OF THE INVENTION

The present invention relates generally to an intake vacuum sensor for measuring intake vacuum in an intake manifold of an internal combustion engine. More specifically, the invention relates to an intake vacuum sensor having a correction device for correcting the sensor signal to compensate for varying output characteristics of the sensor.

In a conventional engine control system, engine load is determined by measuring intake vacuum in the intake manifold using an intake vacuum sensor. Generally, semi-conductor vacuum sensors and the like are used. In such a semi-conductor vacuum sensor, the output characteristic is apt to vary in accordance with increasing temperature and/or duration of use. That is, at relatively high temperatures or after a relatively long period of use, the output characteristics change according to a predetermined ratio.

Therefore, when the intake air temperature increases or the engine is driven for a long period, the determined engine load condition based on the measured intake vacuum pressure is lower than the actual engine load. Therefore, the engine control system cannot accurately effect control operation exactly corresponding to the engine load condition.

SUMMARY OF THE INVENTION

Therefore, it is an object of the present invention to provide an intake vacuum sensor for determining vacuum pressure introduced into an intake manifold, which sensor includes a device for correcting sensor output when relatively high temperature intake vacuum air is introduced thereinto or the engine is driven for a relatively long period.

Another object of the invention is to provide a intake vacuum sensor which can correct the sensor output in response to a correction command fed from an engine control means at a predetermined timing.

According to the present invention, there is provided an intake vacuum sensor with a correction device for correcting the sensor output. The correction device comprises a memory unit for storing a correcting coefficient, a correction circuit for correcting the sensor output based on the correction coefficient and a valve means for selectively introducing intake vacuum and atmospheric air into the intake manifold. The memory unit and the correction circuit are operative in response to correction commands fed from an engine control means.

BRIEF DESCRIPTION OF THE DRAWINGS

The present invention will become more fully understood from the detailed description given below and from the accompanying drawings of a preferred embodiment of the present invention, which, however, are not to be taken as limitative of the present invention but for elucidation and explanation only.

In the drawings.

DESCRIPTION OF THE PREFERRED EMBODIMENT

Figure 1:
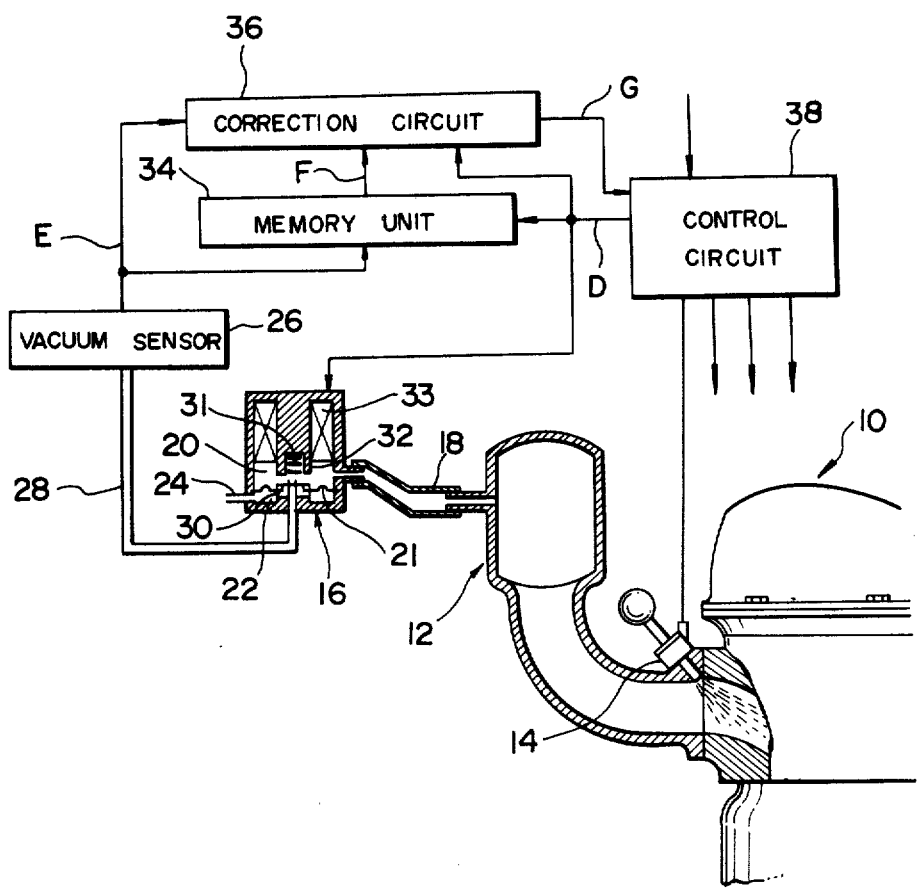
FIG. 1 is a schematic/diagrammatical illustration of an intake vacuum sensing system including a semi-conductor vacuum sensor and sensor signal correction device according to the present invention.

Referring now to the drawings, particularly to FIG. 1, there is schematically illustrated an intake vacuum measuring system including an intake vacuum sensor having a correction device for correcting the sensor signal thereof. Intake air is introduced into an engine cylinder 10 through an air intake passage and an intake manifold 12. A fuel injection valve 14 is provided in the intake manifold through which fuel is discharged into the intake manifold to form the air/fuel mixture. An electromagnetic valve 16 is connected with the intake manifold through a vacuum passage 18. The electromagnetic valve 16 comprises two chambers 20 and 22 separated by a diaphragm 21. The chamber 20 is connected with the intake manifold 12 through the vacuum passage 18. The chamber 22 is open to atmosphere through an opening 24.

The electromagnetic valve 16 is connected with a semi-conductor vacuum sensor 26 through a passage 28. A movable valve element 30 is provided at the opening of the passage 28 in the electromagnetic valve 16 opposing a valve seat 32. A spring 31 urges the movable valve element 30 downwardly in the drawing away from the valve seat 32. The spring 31 determines the initial position of the movable valve member by equalizing the forces an each side thereof. When an electromagnetic actuator 33 is energized, the movable valve element 30 is moved toward the valve seat 32 to establish communication between the chamber 22 and the passage 28. Thus, through the electromagnetic valve 16, the intake vacuum and atmospheric air are selectively fed to the semi-conductor vacuum sensor 26.

Although the embodiment is directed to the intake vacuum sensing system employing semi-conductor type vacuum sensor, the present invention should not be considered as limitative to the specific system as disclosed herewith. The vacuum sensor to be employed in the system can be replaced by any suitable type of vacuum sensor.

Figure 2:
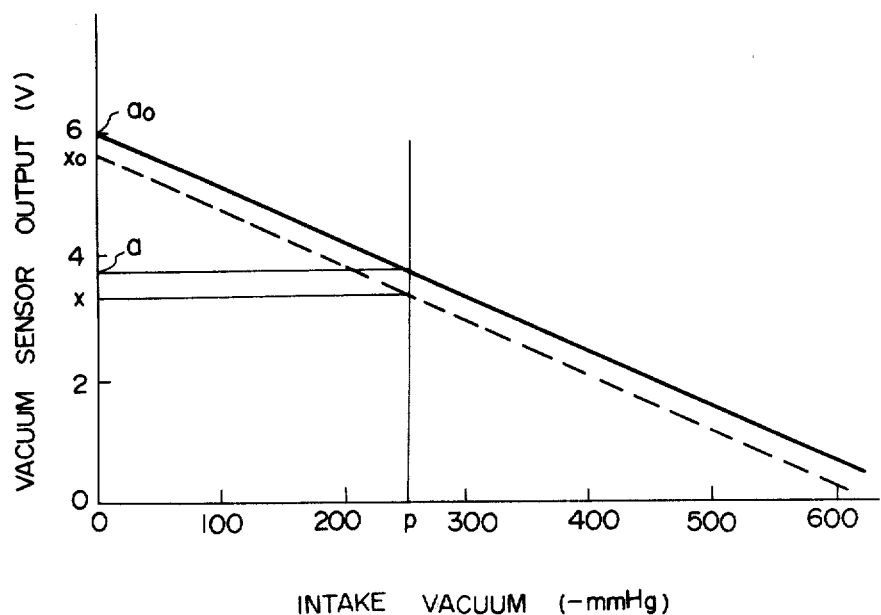
FIG. 2 is a graph showing the variation of sensor output characteristics.

When the intake air temperature increases to a relatively high level or the engine is driven for a relatively long period, the sensor output characteristics vary as shown in FIG. 2. In FIG. 2, the solid line A represents the sensor output characteristics under normal conditions and the broken line B represents the sensor output characteristics under varied (warm or operating) condition. In each case, the sensor output is varied corresponding to linear variations of the intake vacuum pressure. As shown in FIG. 2, the lines A and B are in substantially parallel relationship with respect to each other. This means that variation of the sensor output value corresponding to variation of intake vacuum pressure is linear and the varying rate thereof is constant regardless of the sensor condition. Therefore, variation of the sensor output value $(x_0 - x)$ under varied sensor conditions while the intake vacuum pressure varies from atmospheric $(x_0)$ to pressure p (x) is substantially the same as variation under normal conditions $(a_0 - a)$ while the intake vacuum varies from atmospheric $(a_0)$ to pressure p (a). Further, it will be understood that the difference $(a_0 - x_0)$ of the sensor output value under normal and varied sensor conditions at no load condition wherein the intake vacuum is exactly that of the atmospheric pressure is equal to the difference (a−x) of the sensor output at a load wherein the intake vacuum pressure is p mmHg.

The correct intake vacuum pressure will be obtained by correcting the sensor signal value with the difference ($a_0-x_0$) of the sensor signal value under normal and varied sensor conditions at atmospheric pressure.

In order to obtain the adjusted sensor value, the memory unit 34 receives an initial intake, $a_0$, from the vacuum sensor 26. This value, $a_0$, represents the atmospheric pressure when the sensor 26 is at a normal or cool state. The memory unit 34 is connected to the vacuum sensor 26 and receives the sensor signal generated by the vacuum sensor. When the intake air temperature exceeds a predetermined temperature and/or the engine is driven for a relatively long period of time, atmospheric air and the intake vacuum are selectively introduced into the vacuum sensor. The value from the vacuum sensor, under varied conditions, representing atmospheric pressure is stored in memory unit 34 as $_0$.

This reading is updated periodically so that the $x_0$ value in memory reflects the actual sensor reading for the current engine temperature. The correction command generator within the control circuit controls the valve 16 and determines when the $x_0$ value should be updated.

Figure 3:
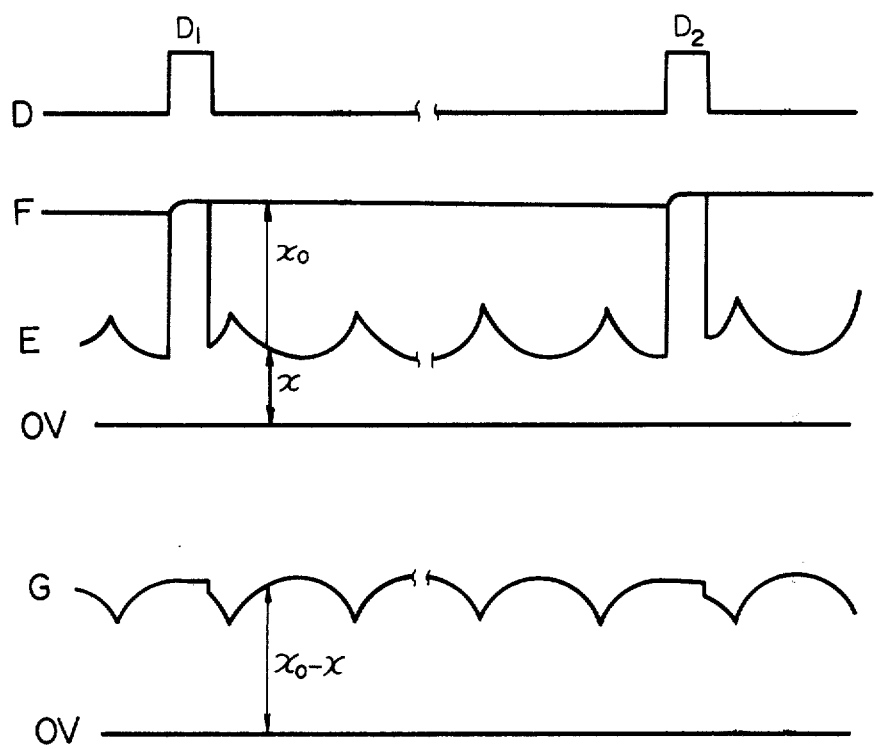
FIG. 3 is a chart of signals generated by various components of the system of FIG. 1.

In FIG. 3, the correction commands $D_1$ and $D_2$ used to expose atmospheric pressure to the vacuum sensor are produced by the control circuit 38 in response to turning on of the starter switch as represented by chart D. The correction commands $D_1$ and $D_2$ are respectively fed to the electromagnetic actuator 33 of the electromagnetic valve 16. The electromagnetic actuator 33 is energized in response to the correction commands $D_1$ and $D_2$ to block communication between the intake manifold 12 and the vacuum sensor 26 and to establish communication between the atmosphere and the vacuum sensor to introduce the atmospheric air into the vacuum sensor. As represented by chart E, the sensor output value is rapidly increased when the vacuum sensor starts measurement of the atmospheric air pressure.

The correction unit 36 receives the sensor output of intake pressure under varied conditions, x, to be compared with the memory unit output value, $x_0$, to determine the difference therebetween.

Assuming the measurement for the intake air pressure at the point in which the intake vacuum pressure is p, correction of the sensor output value is carried out in the following manner. A correction means within the correction circuit 38 receives the output from the memory unit 34 representative of the stored value of the atmospheric air pressure, $x_0$, and sensor output, x. The correction means obtains the difference ($x_0-x$) and produces an output G (FIG. 3) indicative of the obtained difference. The adjusted sensor output, a, is thus obtained by subtracting G from $a_0$, the sensor value for atmospheric pressure under cold conditions.

Therefore, according to the present invention, the sensor signal generated by the semi-conductor vacuum sensor is satisfactorily and effectively corrected. This results in greater accuracy of the control operation effected by the control circuits, such as the fuel injection control circuit.

What is claimed is:

1. An intake vacuum sensing system for an internal combustion engine comprising:

a vacuum sensor connected with an intake manifold of the internal combustion engine and adapted to produce a sensor signal having a signal value proportional to the vacuum pressure in the intake manifold;

a switching valve means interposed between said vacuum sensor and said intake manifold and in communication with the atmosphere for selectively introducing either the intake vacuum or atmospheric air into said vacuum sensor, which switching valve means is responsive to a correction command to introduce atmospheric air for a predetermined period of time;

a correction command generator cyclically generating said correction command to be fed to said switching valve means, which correction command generator is responsive to the turning on of an engine starter switch to produce the first correction command;

a memory unit operative in response to said correction command to store a sensor signal value representative of atmospheric air pressure, which memory unit is responsive to said first correction command to store the sensor signal value as a memory value and is responsive to a trailing correction command for updating said memory value with the sensor signal value;

a correcting means responsive to said correction command to compare the sensor signal value with said memory value stored in said memory means, and for determining the difference therebetween, said correction means correcting the sensor signal value indicative of detected intake vacuum pressure based on the determined difference.

2. A system as set forth in claim 1, wherein said switching valve means is an electromagnetic valve.

3. A system as set forth in claim 1, wherein said correction command generator is operative in response to turning on the engine ignition switch.

4. A system as set forth in claim 2 or 3, wherein said correction command is a pulse signal having pulse width defining an energized period of said switching valve means to introduce atmospheric air into said vacuum sensor and operate said memory means to update the value of sensor signal.

5. A system as set forth in claim 1, wherein said correction means clamps said final sensor signal at the value immediately before said correction command and maintains said clamped value during the pulse duration.

6. An intake vacuum sensing system for an internal combustion engine comprising:

a pressure sensor for detecting the pressure of a fluid introduced therein and for producing a sensor signal having a value proportional to the detected fluid pressure;

a switching valve provided in a passage connecting said pressure sensor and an intake manifold of the engine, said switching valve communicating to atmosphere to selectively introduce the intake vacuum or atmospheric air into said pressure sensor, said switching valve being movable between a first position connecting said intake manifold to said pressure sensor and a second position exposing said pressure sensor to atmosphere and being responsive to a correction command to switch the valve position from said first position to said second position;

a memory unit for storing a memory value representative of atmospheric pressure when the engine starter switch is turned on and, said memory unit updating said memory value with said sensor signal value in response to said correction command; and a control circuit responsive to the turning on of said starter switch for producing the correction command, said control circuit being operative to obtain a correction value based on a difference between said sensor signal value and said memory value stored in said memory unit and to correct the sensor signal value with the obtained correction value to produce a sensor output representative of the corrected sensor signal.

7. A system as set forth in claim 6, wherein said switching valve incorporates therein an electromagnetic actuator responsive to said correction command to switch said switching valve from said first position to said second position.

8. A system as set forth in claims 6 or 7, wherein said control circuit clamps the sensor signal indicative of the vacuum pressure in the intake manifold valve in response to the correction command.

* * * * *